(No Model.)
G. D. MOFFAT.
CANDY AND PROCESS OF MANUFACTURING THE SAME.
No. 356,394. Patented Jan. 18, 1887.
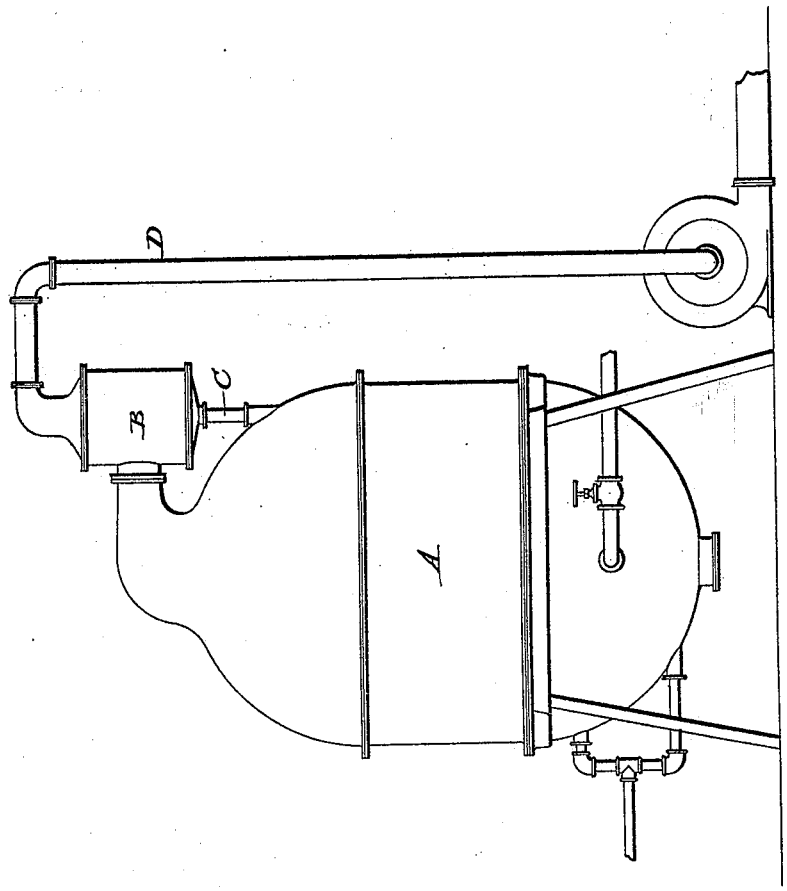
Attest.
Sidney P. Hollingsworth
Wm R Kennedy
Inventor.
Geo. D. Moffat
By his Atty.
Phil. T. Dodge.

UNITED STATES PATENT OFFICE.

GEORGE D. MOFFAT, OF CHICAGO, ILLINOIS, ASSIGNOR TO THOMAS KANE, OF SAME PLACE.

CANDY AND PROCESS OF MANUFACTURING THE SAME.

SPECIFICATION forming part of Letters Patent No. 356,394, dated January 18, 1887.

Application filed March 17, 1886. Serial No. 195,569. (No specimens.)

*To all whom it may concern:*

Be it known that I, GEORGE D. MOFFAT, of Chicago, in the county of Cook and State of Illinois, have invented certain Improvements in Candy and Processes of Manufacturing the Same, of which the following is a specification.

The objects of my invention are to produce candy, more particularly stick-candy, of a quality superior to that resulting from the ordinary process as regards its clearness or brilliancy, its strength, and its resistance to atmospheric influences, and at the same time to lessen the cost of manufacture.

In the manufacture of stick-candy as heretofore practiced it has been customary to boil the cane sugar or sirup, either alone or with a small percentage of glucose, in open kettles or pans until it acquired a proper consistency. This method of treating the sugar necessitated the employment of very high temperatures, which commonly resulted in the carbonization and discoloration of the sugar and in the production of a candy of dark appearance. The candy produced by this process is exceedingly brittle, so that in being handled and transported there is a heavy deterioration and loss from breakage. It is also objectionable, in that it is peculiarly susceptible to the influence of moisture and increased temperatures, which render it adhesive and otherwise troublesome to carry in stock for any considerable length of time.

I have discovered that by the addition of a large percentage of glucose I am enabled to produce a candy which possesses increased strength, greater brilliancy and clearness, and a greater power of resisting the influence of moisture.

Under the methods heretofore practiced it was impossible or impracticable to incorporate with the cane-sugar a sufficient amount of glucose to secure the ends which I have in view. I have discovered, however, that by making use of a vacuum-pan or other equivalent apparatus for boiling the materials *in vacuo*, I can combine with the cane-sugar from twenty-five to fifty per cent., or even a greater percentage, of glucose, and that this compound may be cooked to a consistency suitable for stick-candy without discoloration and without injuriously affecting the ingredients. I have also discovered that the compound of cane-sugar and glucose may be thus brought to the required consistency at comparatively low temperatures, so that when delivered from the pan or kettle it may be immediately handled by the workman and finished into the required forms without undergoing the usual cooling treatment.

The essence of my invention consists in subjecting a compound of cane-sugar and glucose or grape-sugar to a cooking or boiling action *in vacuo;* and it is to be distinctly understood that the apparatus for carrying out this process may be modified in form and construction at will, that the temperature may be regulated, and the period of the cooking operation lengthened or shortened, according to the nature of the sugar employed and the character of the candy required.

As my process is directed chiefly to the manufacture of stick-candy, I commonly proceed by dissolving cane-sugar and glucose in water. In dissolving the cane-sugar particular care is to be observed that all evidences of crystallization disappear, it being well known to those familiar with the art of sugar-making that the presence of sugar-crystals in small quantity is frequently followed by crystallization of the entire mass. This crystallization—the end in view in sugar-manufacture—is to be carefully avoided in the manufacture of candy. I place the compound of cane-sugar and glucose in the vacuum pan or kettle and boil or cook the same, commonly at a temperature of about 212° Fahrenheit, until the mass assumes that particular condition known in the art as a "hard-crack" or stick-candy consistency, whereupon it is removed from the pan and treated in the ordinary manner.

I am aware that it has been proposed to cook cane-sugar *in vacuo* for the purpose of preparing the same for the manufacture of what is known in the art as "rock-candy." To produce this candy, the sugar is necessarily delivered from the pan in a thin or fluid condition, to the end that it may properly crystallize in the subsequent operations. This fluid for the manufacture of rock-candy is widely different in consistency, as well as in its constituent elements, from the material which I employ for the manufacture of stick-candy, and is wholly unsuited therefor.

In practice I find that the addition of glucose to the cane-sugar is a matter of great advantage, as it permits the compound to be brought in the vacuum-pan to a condition not otherwise attainable, and also for the reason that the resulting product possesses greater strength, durability, and brilliancy than it would otherwise have.

In practice I find that candy manufactured in accordance with my invention possesses a peculiar appearance, by which it may be readily distinguished on inspection from candy manufactured in the ordinary manner.

I do not claim as my invention the manufacture of candy from a compound of grape-sugar and glucose boiled, and afterward manipulated in the usual manner, in an open kettle.

In the accompanying drawing I have illustrated, in outline, an apparatus suitable for carrying my invention into effect.

A represents an ordinary vacuum-pan provided with an overflow-chamber, B, and with a tube, C, for returning the overflowing material to the pan.

D represents an exhaust-pipe, leading from the pan to a condenser-pump or other apparatus, by which the vapors are withdrawn and the necessary vacuum maintained within the pan.

Having thus described my invention, what I claim is—

1. The improved method of manufacturing candy, consisting in cooking a compound of cane-sugar and glucose *in vacuo* until it acquires a consistency appropriate for the production of the candy demanded.

2. The improved method of manufacturing candy, consisting in cooking cane-sugar and glucose *in vacuo* until it arrives at a hard-crack or stick-candy consistency.

3. The new product, the herein-described candy, composed of glucose and grape-sugar having as distinctive characteristics whiteness, clearness, hardness, and resistance to atmospheric moisture.

In testimony whereof I hereunto set my hand, this 3d day of March, 1886, in the presence of two attesting witnesses.

GEORGE D. MOFFAT.

Witnesses:
P. T. DODGE,
ROBT. E. MORRIS.